(12) United States Patent
Banvait et al.

(10) Patent No.: US 10,971,014 B2
(45) Date of Patent: Apr. 6, 2021

(54) BOLLARD RECEIVER IDENTIFICATION

(71) Applicant: Ford Global Technologies, LLC., Dearborn, MI (US)

(72) Inventors: Harpreetsingh Banvait, Sunnyvale, CA (US); Scott Vincent Myers, Camarillo, CA (US); Ashley Elizabeth Micks, Mountain View, CA (US); Sneha Kadetotad, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 129 days.

(21) Appl. No.: 16/293,080

(22) Filed: Mar. 5, 2019

(65) Prior Publication Data

US 2019/0197901 A1 Jun. 27, 2019

Related U.S. Application Data

(63) Continuation of application No. 15/010,665, filed on Jan. 29, 2016, now Pat. No. 10,262,540.

(51) Int. Cl.
*G08G 1/16* (2006.01)
*B62D 15/02* (2006.01)
(Continued)

(52) U.S. Cl.
CPC ......... *G08G 1/165* (2013.01); *B60G 17/0165* (2013.01); *B60R 1/00* (2013.01);
(Continued)

(58) Field of Classification Search
CPC .......... G08G 1/165; G08G 1/16; B62D 15/02; B62D 15/0265; B60G 17/0165; B60G 2401/142; B60G 2401/16; B60G 2401/174; B60G 2400/823; B60G 2400/824; B60G 2800/162; B60R 1/00; B60R 2300/8093; B60Y 2200/10; B60W 30/09; B60W 40/06; G01S 13/00; G01S 15/00; G01S 17/00;
(Continued)

(56) References Cited

U.S. PATENT DOCUMENTS 8,787,619 B2 7/2014 Del Grande
2009/0315993 A1 12/2009 Hirai
(Continued)

FOREIGN PATENT DOCUMENTS

CN 104228831 A * 12/2014
EP 2765546 A1 8/2014
JP 01026914 A * 1/1989

*Primary Examiner* — Aaron L Troost
(74) *Attorney, Agent, or Firm* — David R. Stevens; Stevens Law Group

(57) ABSTRACT

The disclosure relates generally to methods, systems, and apparatuses for automated or assisted driving and more particularly relates to identification, localization, and navigation with respect to bollard receivers. A method for detecting bollard receivers includes receiving perception data from one or more perception sensors of a vehicle. The method includes determining, based on the perception data, a location of one or more bollard receivers in relation to a body of the vehicle. The method also includes providing an indication of the location of the one or more bollard receivers to one or more of a driver and component or system that makes driving maneuver decisions.

20 Claims, 5 Drawing Sheets

(51) Int. Cl.
*B60G 17/0165* (2006.01)
*B60R 1/00* (2006.01)
*G05D 1/02* (2020.01)

(52) U.S. Cl.
CPC ....... *B62D 15/0265* (2013.01); *G05D 1/0246* (2013.01); *B60G 2400/823* (2013.01); *B60G 2400/824* (2013.01); *B60G 2401/142* (2013.01); *B60G 2401/16* (2013.01); *B60G 2401/174* (2013.01); *B60G 2800/162* (2013.01); *B60R 2300/8093* (2013.01); *B60Y 2200/10* (2013.01); *G05D 2201/0213* (2013.01)

(58) Field of Classification Search
CPC ................... G05D 1/02; G05D 1/0246; G05D 2201/0213; G05D 1/0214; G05D 2201/0212
See application file for complete search history.

(56) References Cited

U.S. PATENT DOCUMENTS

| | | | |
|---|---|---|---|
| 2011/0313665 A1 | 12/2011 | Lueke | |
| 2014/0022109 A1 | 1/2014 | Lee | |
| 2014/0198619 A1 | 7/2014 | Lamb | |
| 2014/0371985 A1* | 12/2014 | Tseng | B60G 17/0165 701/38 |
| 2016/0139262 A1* | 5/2016 | Staynov | G01S 13/86 342/52 |
| 2016/0280265 A1* | 9/2016 | Hass | B62D 15/0265 |

\* cited by examiner

BOLLARD RECEIVER IDENTIFICATION

CROSS REFERENCE TO RELATED PATENT APPLICATION(S)

The present disclosure is part of a continuation of U.S. patent application Ser. No. 15/010,665, filed on Jan. 29, 2016, the content of which is incorporated by reference in its entirety.

TECHNICAL FIELD

The disclosure relates generally to methods, systems, and apparatuses for automated or assisted driving and more particularly relates to identification, localization, and navigation with respect to bollard receivers.

BACKGROUND

Automobiles provide a significant portion of transportation for commercial, government, and private entities. Due to the high value of automobiles and potential harm to passengers and drivers, driver safety and avoidance of collisions, accidents, or other damage to vehicles are extremely important. For example, bollard receivers are often located within a street or roadway and are used to mount bollards (e.g., posts) that are installed on the street or roadway to direct or block traffic on a part of the street or roadway. When bollards are removed from the bollard receivers, the bollard receivers remain in the street or roadway and can cause damage to portions of a vehicle if the vehicle drives over a bollard receiver. Thus, it is important to identify and locate potential problems in a street or roadway, such as bollard receivers, to avoid potential damage to a vehicle.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
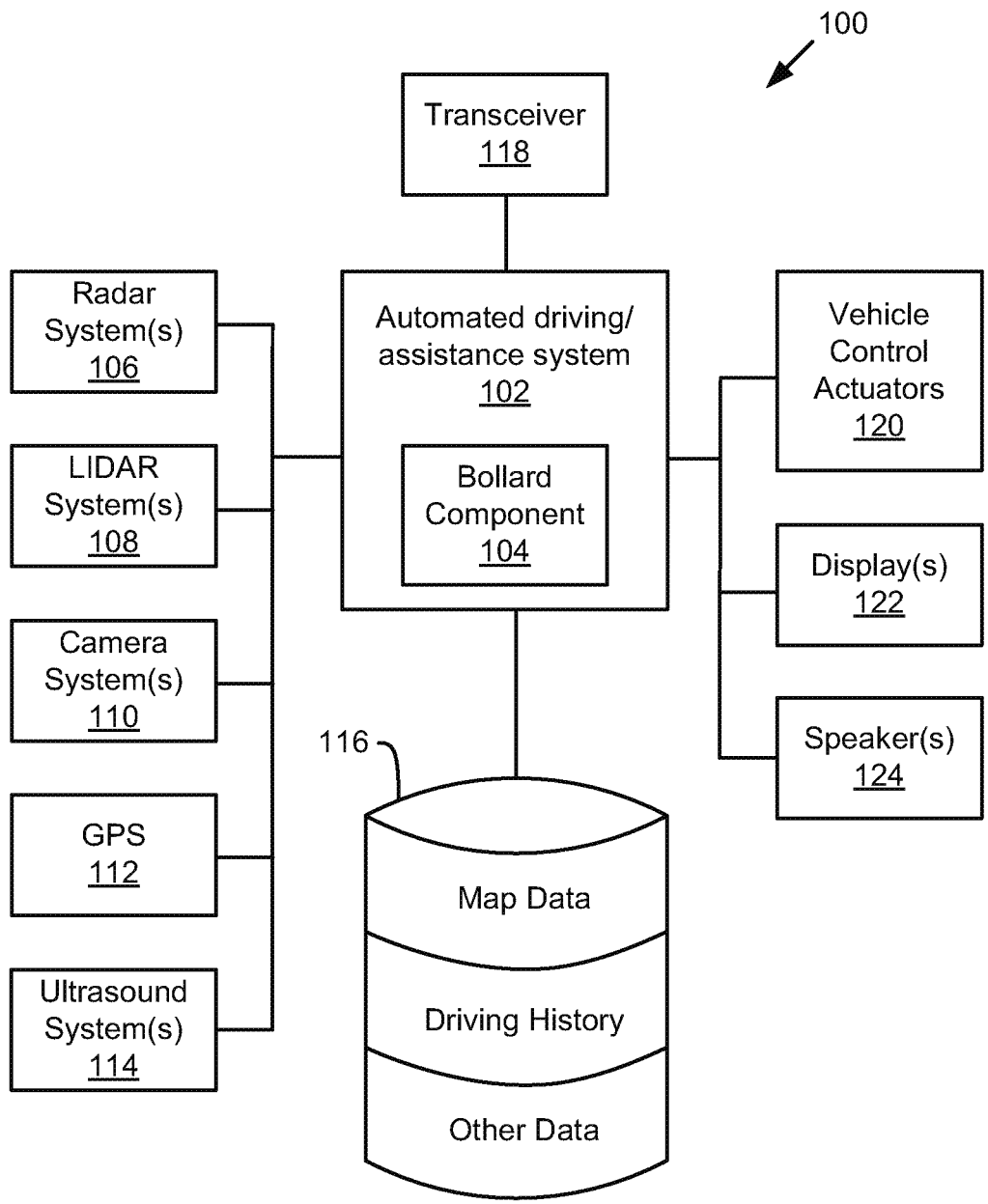
FIG. 1 is a schematic block diagram illustrating an implementation of a vehicle control system that includes an automated driving/assistance system.

The disclosure relates generally to methods, systems, and apparatuses for automated or assisted driving and more particularly relates to identification, localization, and navigation with respect to bollard receivers. Bollards are short vertical posts that are sometimes used to direct, reroute, or block traffic on a roadway. In order to enable flexibility in blocking or rerouting traffic, some bollards are removable and can be selectively mounted in a bollard receiver. With bollards removed, vehicles may be allowed to pass. However, these bollard receivers can cause severe damage to a vehicle if they are not noticed and the vehicle is driven over them. Specifically, driving over bollard receivers can cause damage to vehicle tires or other portions of the vehicle. For example, sharp edges may form on the bollard receivers, which can slice or cut tires. As another example, depending on how high the bollard receivers protrude above the ground, parts underneath the vehicle, such as the front suspension, may impact the bollard receivers and be damaged.

The present disclosure describes systems, methods, and devices for detecting bollard receivers and avoiding vehicle damage. According to one embodiment, a method includes receiving perception data from one or more perception sensors of a vehicle and determining, based on the perception data, a location of one or more bollard receivers in relation to a body of the vehicle. The method also includes providing an indication of the location of the one or more bollard receivers to one or more of a driver and driving maneuver decision component.

Perception data may be received from sensors or other data sources for a driving system. For example, perception data may include data from a camera, a radar system, a light detection and ranging (LIDAR) system, an ultrasound system, and/or a control area network (CAN) bus of a vehicle. Any of this sensor data can be provided as input to a fusion algorithm trained to detect and/or localize bollard receivers.

In one embodiment, system or method may determine an X, Y and Z location of a bollard receiver with reference to a body co-ordinate system of the vehicle. For example, the sensor input may be combined to estimate the location of bollard receivers with reference to the vehicle. Additionally, by using the information from the CAN bus like pitch, vehicle speed, and height (e.g., a height of one or more portions of an undercarriage of the vehicle) a position of the front wheels can be accurately determined. The X, Y, and Z location of bollard receivers may be used by the vehicle (or a driver) to navigate through the bollard receiver without doing any damage to the vehicle. Furthermore, a height and other location information may be used to determine how to control active suspension of the vehicle to reduce or avoid damage to the vehicle or to increase comfort in case a bollard receiver cannot be avoided. A system may alternatively, or additionally, provide a warning to a human driver such that damage to the car can be prevented. Thus, the detection and localization by a system may be used to automatically warn a human driver, automated driving system, or driving assistance system or to increase driver or passenger comfort without additional sensor cost to the system.

The present disclosure also describes systems, methods, and devices for navigating through or around bollard receivers. For example, once data from sensors is used to accurately detect the presence of the bollard receivers, it may be necessary to compute a best or safest path over, between, or around the bollard receivers to ensure no damage or minimal damage to the vehicle. In one embodiment, a vehicle perception system uses vehicle sensors to detect a presence of bollard receivers on the roadway ahead. The location (i.e., x, y position or dimension) as well as height (i.e., z dimension)

of each receiver with respect to the vehicle reference frame is then known. With the knowledge of the height of the vehicle's suspension above ground, a control action may be taken to hit the brakes and stop if the receiver's height is greater than the height of the vehicle's suspension or an action may be taken to maneuver or proceed around the receivers, if possible.

In one embodiment, if the height of a bollard receiver is not greater than the vehicle's suspension height, then the vehicle still needs to navigate itself so as to prevent the wheels of the vehicle from being damaged by the bollard receivers. To ensure that no part of the vehicle is damaged, a system may enforce a safety margin (e.g., such as about one foot) to maintain between each wheel of the vehicle and the bollard receivers.

According to one implementation, a circle with a radius equal to the safety margin and centered at a bollard receiver is determined as a region to have tires of the vehicle avoid. An angle formed between an x-axis of the body coordinate system of the vehicle (e.g., longitudinal axis of the vehicle frame) and a tangent from the center of the front axle to an edge of the circle is calculated. In one embodiment, the tangent is always drawn towards a side away from oncoming traffic. For example, the tangent may be drawn to the right-hand side in right-hand side driving environments as this would cause the vehicle to drive over the shoulder, if needed, as opposed to entering into an oncoming traffic lane. The angle between the x-axis and tangent may be used as the desired heading angle of the vehicle. The vehicle control system may minimize the error between the vehicle's current heading angle and the desired angle and, in the process, safely navigate past the bollard receivers without causing any damage to the vehicle. In one embodiment, extra care is taken to prevent the tire sidewalls from coming into contact with the bollard receivers as they can have sharp edges, and damage to the sidewalls are usually not legally repairable and can cause particularly sudden deflation.

Referring now to the figures, FIG. 1 illustrates an example vehicle control system 100 that may be used to automatically detect bollard receivers. An automated driving/assistance system 102 may be used to automate or control operation of a vehicle or to provide assistance to a human driver. For example, the automated driving/assistance system 102 may control one or more of braking, steering, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may include a bollard component 104 that uses a neural network, or other model or algorithm, to determine that a bollard receiver is present and may also determine location, height, or other information about the bollard receiver. In one embodiment, the automated driving/assistance system 102 may determine a driving maneuver or driving path to avoid or reduce damage to a vehicle that may result from driving over or near the bollard receivers.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultra sound systems 114. The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time. The automated driving/assistance system 102 may implement an algorithm or use a model, such as a deep neural network, to process the sensor data and identify a presence, location, and/or height of a bollard receiver.

Figure 2:
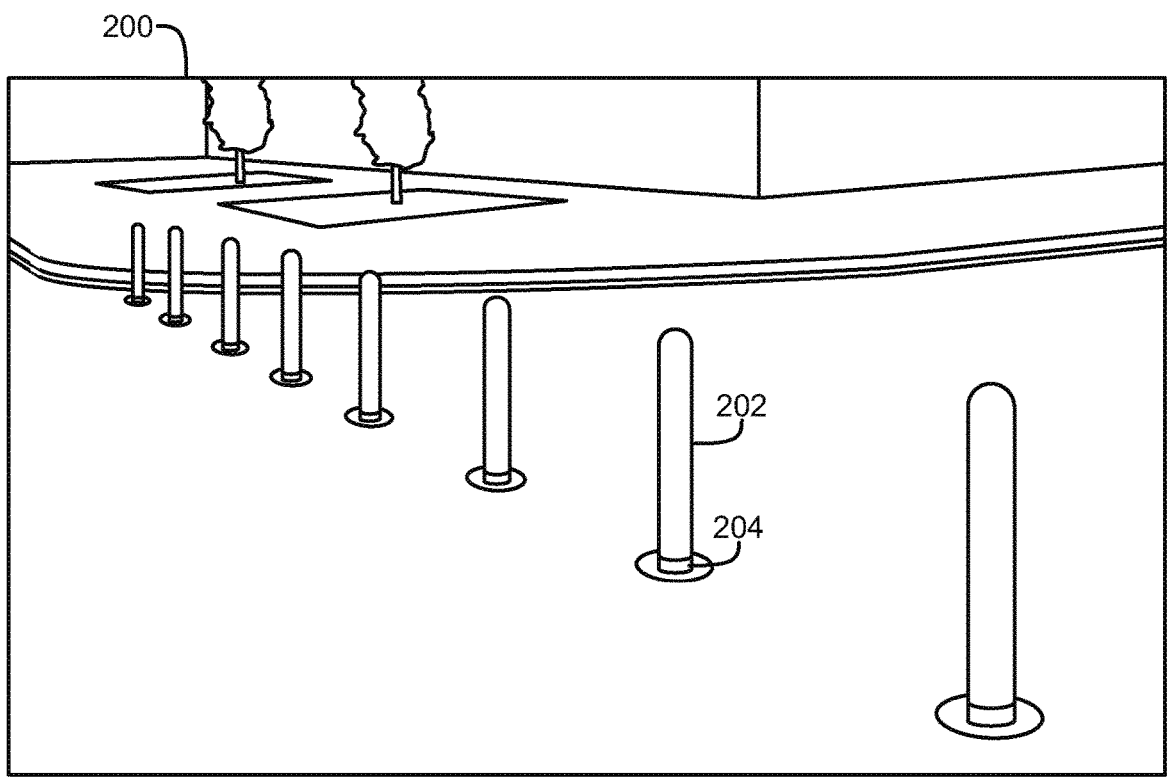
FIG. 2 illustrates a plurality of bollards located in bollard receivers, according to one implementation.

Referring now to FIG. 2, a picture or image 200 of a plurality of bollards 202 is illustrated. The bollards 202 are shown distributed across a roadway. The bollards 202 may be used to restrict traffic along the roadway, for example, to allow pedestrians to safely cross a street or intersection. In one embodiment, the bollards 202 may be selectively removed or installed in bollard receivers 204 to provide the ability to selectively allow or block traffic. For example, the bollards 202 may be installed in the bollard receivers 204 during events when there may be large number of pedestrians and it is desired to block traffic along the roadway or through the intersection. Similarly, the bollards 202 may be removed when it is desirable for traffic to move through the roadway or intersection. However, even when the bollards 202 are removed, the receivers 204 must generally remain in or on the roadway.

Figure 3:
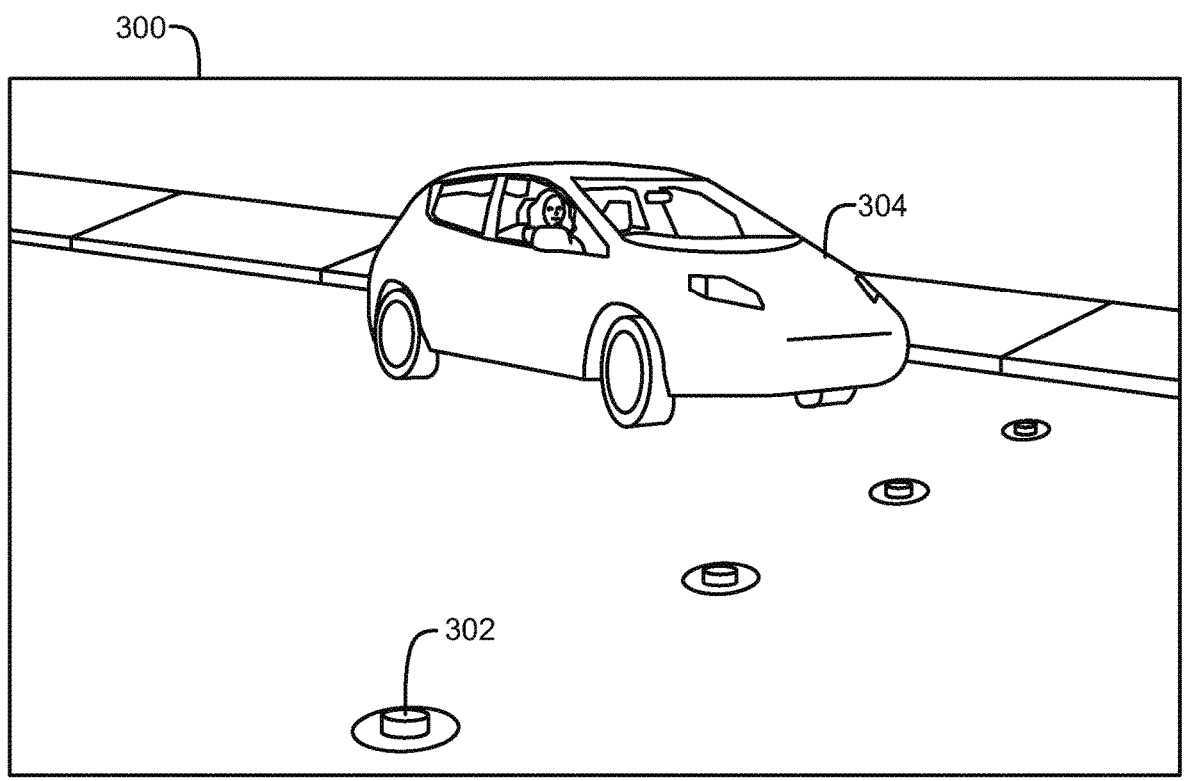
FIG. 3 illustrates a plurality of bollard receivers with the bollards removed, according to one implementation.

FIG. 3 illustrates a picture or image 300 of a roadway with bollard receivers 302 where the bollards (such as bollards 202) have been removed. Due to the absence of the bollards, a vehicle 304 may be allowed to drive along the roadway. However, bollard receivers 302 sometimes extend some height above a roadway and may present a risk of damaging portions of a vehicle, reducing driver or passenger comfort, or otherwise interrupting driving of a vehicle 304. In one embodiment, a bollard component 104 (e.g., in the vehicle 304) may detect and localize the bollard receivers 302 and determine a driving maneuver or driving path to avoid causing damage to the vehicle 304. The bollard component 104 may determine a path that includes avoiding impact with the bollard receivers 302. In one embodiment, the bollard component 104 may determine a path that cause one or more tires to impact the bollard receivers with a tread of the one or more tires. For example, bollard receivers 302 may have sharp metal edges that can be particularly damaging to sidewalls of vehicle tires. In one embodiment, the bollard component 104 may determine that the bollard receivers 302 extend to a height sufficient to damage an undercarriage or other part of the vehicle 304 and may cause the vehicle to stop before impacting a bollard receiver 302.

Figure 4:
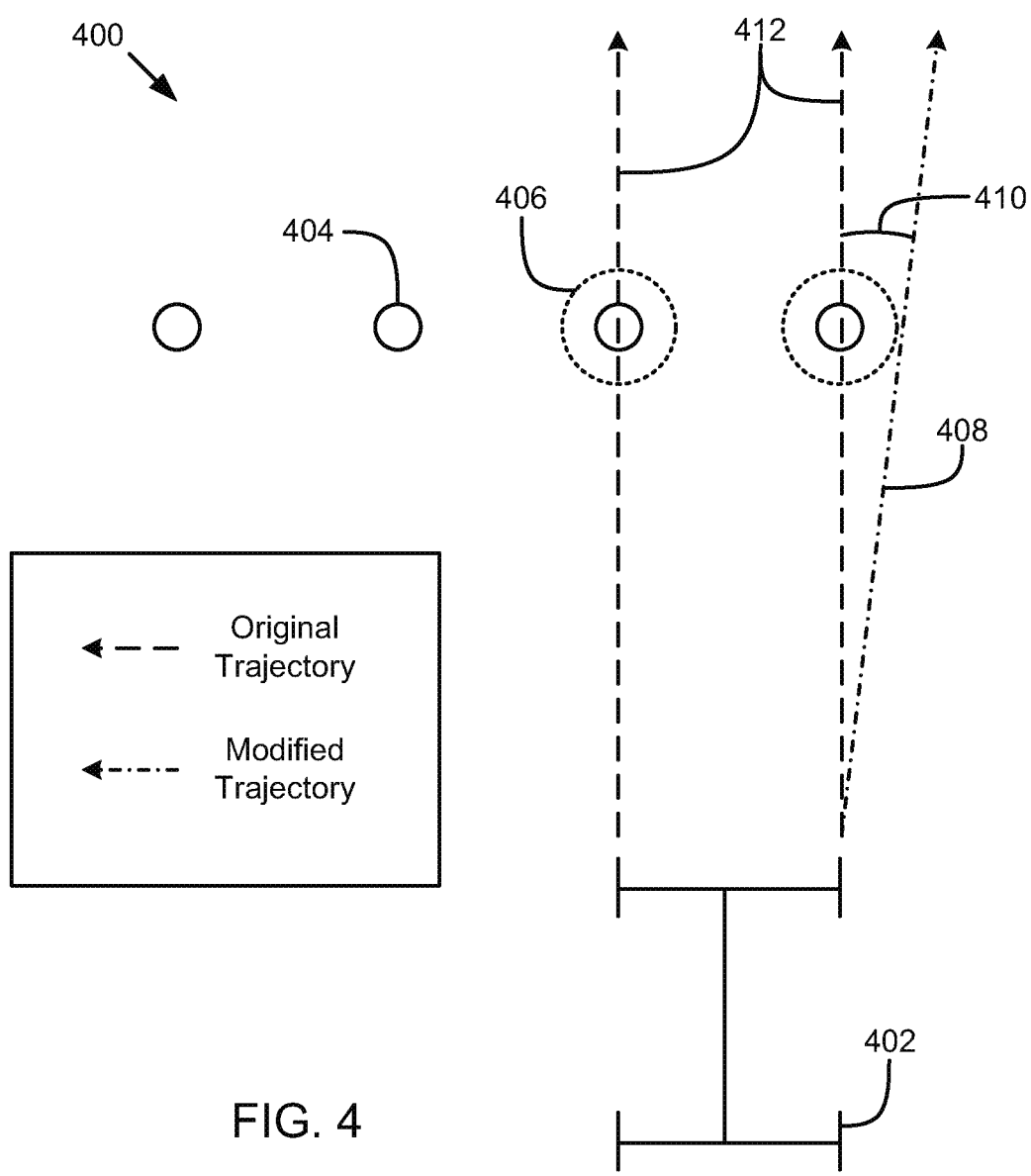
FIG. 4 is a schematic top view diagram illustrating modifying a trajectory based on the presence of bollard receivers, according to one implementation.

FIG. 4 is a schematic top view diagram 400 illustrating the determination of a driving path that provides a safety margin between a vehicle's tires and any bollard receivers, according to one embodiment. The diagram 400 shows a vehicle 402 having an original trajectory indicated by dashed lines 412. A plurality of bollard receivers 404 are located ahead of the vehicle 402. In one embodiment, a bollard component 104 of the vehicle 402 may detect the bollard receivers 404. The bollard component 104 may determine a location, height, size, or the like of the bollard receivers 404.

In one embodiment, the bollard component 104 identifies a safety margin region 406 around one or more of the bollard receivers 404, which should be avoided by tires of the vehicle 402. The safety margin regions 406 may include circles centered on the bollard receivers 404 having a safety margin radius. The safety margin may be predetermined, for example based on a height of a lowest non-tire portion of a vehicle. In one embodiment, the safety margin may be determined based on a height of the bollard receivers 404. The bollard component 104 may calculate a modified trajectory based on a current location of the vehicle 402 and the safety margin regions 406. In one embodiment, the bollard component 104 may determine a tangent line 408 that is tangent to a safety margin region 406 and intersects with a current trajectory of a tire. An angle 410 between the original trajectory (line 412) and a tangent line 408 may be computed to determine a required change in heading in order to avoid the safety margin region(s) 406. In one embodiment, if the angle 410 is too great for a current velocity of the vehicle to perform, the bollard component 104 may slow the vehicle 402, stop the vehicle 402, or cause the vehicle 402 to impact the bollard receivers 404 with a tread portion of one or more tires. The bollard component 104 may select a maneuver based on a safest or available maneuver based on the current driving environment (e.g., speed, nearby objects or cars, or the like).

Figure 5:
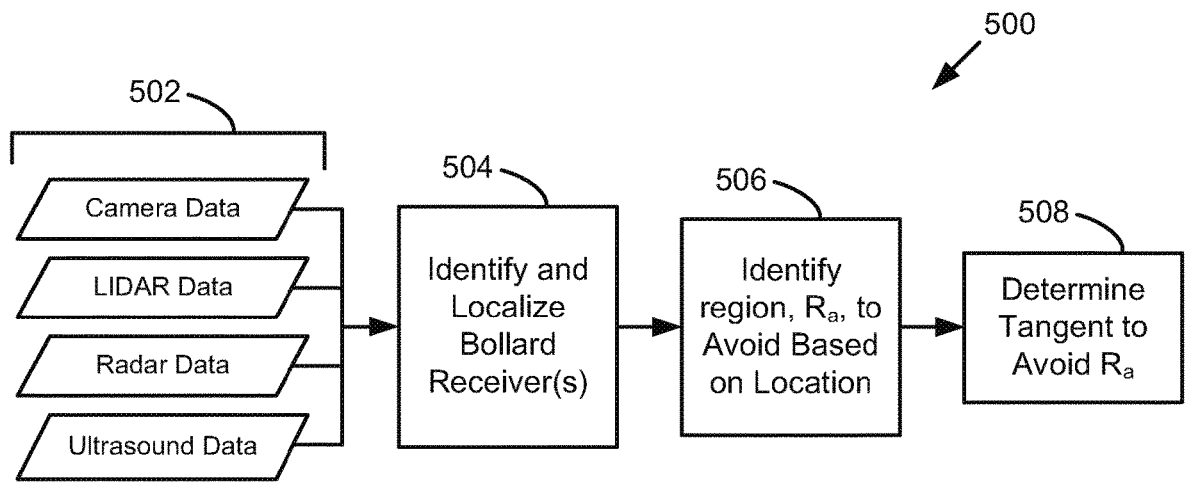
FIG. 5 is a schematic diagram illustrating a method for determining a change in heading for a vehicle, according to one implementation.

FIG. 5 is a schematic diagram illustrating a method 500 for computing a change in heading, according to one embodiment. The method 500 may be performed by a bollard component 104 and/or an automated driving/assistance system 100.

Perception data 502 is received and a system identifies and localizes one or more bollard receivers at 504. Based on the location of the bollard receivers, the system identifies a region, $R_a$, to avoid at 506. For example, the region $R_a$ may include a circle centered on a bollard receiver and having a radius corresponding to a safety margin for a parent vehicle. The system determines a line tangent to the region $R_a$ that intersects a current trajectory of the vehicle at 508. Based on the tangent line a change in heading, such as an angle between the tangent line and the current trajectory, may be computed. A maneuver to change the heading by the specified amount may then be performed by the vehicle to avoid damage from the bollard receivers.

Figure 6:
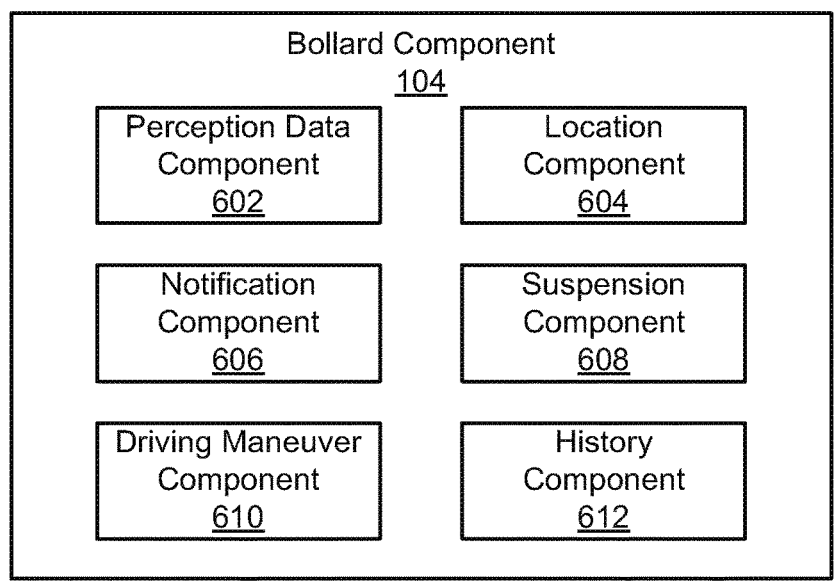
FIG. 6 is a schematic block diagram illustrating example components of a bollard component, according to one implementation.

FIG. 6 is schematic a block diagram illustrating example components of a bollard component 104. In the depicted embodiment, the bollard component 104 includes a perception data component 602, a location component 604, a notification component 606, a suspension component 608, a driving maneuver component 610, and a history component 612. The components 602-612 are given by way of illustration only and may not all be included in all embodiments. In fact, some embodiments may include only one or any combination of two or more of the components 602-612. Some of the components 602-612 may be located outside the bollard component 104.

The perception data component 602 is configured to receive perception data from one or more perception sensors of a vehicle. For example, the perception data component 602 may receive sensor data from a camera, a radar system, a LIDAR system, and/or an ultrasound sensor. The perception data may include data for regions in any direction from the vehicle. For example, as a vehicle navigates down a road, or through any other driving environment, sensor systems may periodically provide data regarding the driving environment.

The location component 604 is configured to detect and/or determine a location of one or more bollard receivers. In one embodiment, the location component 604 determine a location of one or more bollard receivers with respect to a vehicle. For example, the location component 604 may generate an X, Y, and/or Z coordinate for one or more of the bollard receivers with respect to the vehicle or a body coordinate system of the vehicle. The X parameter may indicate a distance to a front or rear of a front bumper, center, or other location of a vehicle. The Y parameter may indicate a distance to a left or right of a side panel, center, or other location of a vehicle. The Z parameter may indicate a height of the bollard receiver with respect to a driving surface or a tire of the vehicle. In one embodiment, the location of the bollard receiver may be determined based, at least partially, on information from a CAN bus of the vehicle. For example, the CAN bus may provide information such as vehicle pitch, vehicle speed, vehicle height, or any other information about the vehicle and the location component 604 may determine a location of the one or more bollard receivers based on this information.

In one embodiment, the location component 604 may determine the location of the bollard receivers based, at least partially, on a vehicle driving history. For example, the driving history of a parent vehicle or another vehicle may include information about the location, height, or size of the bollard receivers. By referencing the driving history, the location component 604 can determine where to look to detect and/or obtain an accurate location for the bollard receivers with respect to the vehicle.

The notification component 606 is configured to provide a notification of the presence or location of one or more bollard receivers to a human driver or a portion of a system that makes driving decisions. In one embodiment, the notification component 606 may provide a notification to a human driver that the bollard receivers are present. For example, the notification may be provided on a display, such as a heads-up display, or using a speaker to provide a voice or audio notification. The notification may indicate a location of the one or more bollard receivers to direct the human driver's attention to the location of the bollard receivers. In one embodiment, the notification component 606 suggests a maneuver to be performed. For example, the notification component 606 may suggest that a driver slow down or stop, change a heading to avoid impacting the bollard receivers, or perform any other driving maneuver.

In one embodiment, the notification component 606 is configured to notify a decision making system or component of an automated driving/assistance system 102. For example, the notification component 606 may provide a notification to a driving maneuver component 610 indicating a location of the bollard receivers or a suggested maneuver to perform to avoid the bollard receivers. The decision making system or component of the automated driving/assistance system 102 may then be able to use the location or suggested maneuver and take that information into account in determining a driving path or driving maneuvers to be performed by the vehicle.

The suspension component 608 is configured to adjust suspension of a vehicle in response to detection and/or localization of bollard receivers. For example, the suspension component 608 may increase a suspension height at one or more wheels of the vehicle to avoid impact between portions of the vehicle and the bollard receivers. As another example, the suspension component 608 may modify a suspension height or firmness. In one embodiment, the suspension component 608 may adjust an active or semi-active suspension system to increase safety, driver comfort, or the like based on a height or location of the bollard receivers. For example, bollard receivers that are even with a road surface may require no suspension adjustment, while bollard receivers that extend above a threshold height (e.g., above an inch) may require a large amount of suspension adjustment. In one embodiment, an amount of adjustment for the suspension may be based on current speed or velocity of a vehicle, height of the bollard receivers, an angle or curvature of a road surface, or any other information about the vehicle or a surrounding driving environment.

The driving maneuver component 610 is configured to determine or select one or more driving maneuvers for a vehicle. In one embodiment, the driving maneuver component 610 may determine a driving maneuver based on information about the vehicle, current driving conditions, current velocity or other information from a CAN bus, and/or a height and location of the bollard receivers. In one embodiment, the driving maneuver component 610 determines a driving maneuver that will avoid or reduce damage to the vehicle. For example, the driving maneuver component 610 may compare a height of the bollard receiver to a known height of a portion of the vehicle to determine whether the vehicle should stop and not proceed over the one or more bollard receivers or whether the vehicle should be maneuvered to avoid passing certain regions of the vehicle over the location of one or more bollard receivers. In one embodiment, the driving maneuver component 610 may select or identify driving maneuvers that could be performed to follow a safe driving path through or around the bollard receivers.

In one embodiment, the driving maneuver component 610 determines a change in heading for a current or future position of the vehicle to avoid impact with or damage from the bollard receivers. For example, the driving maneuver component 610 may identify one or more areas to avoid and may then identify a change in heading to avoid those areas. In one embodiment, the driving maneuver component determines a safety margin for avoiding bollard receivers. In one embodiment, the safety margin may be based on the specific vehicle, the specific height of the bollard receiver, and/or one or more driving conditions. Based on the safety margin, the driving maneuver component 610 may identify safety margin regions centered on each bollard receiver, which the vehicle should avoid. In one embodiment, the safety margin regions are circular regions surrounding each detected bollard receiver.

In one embodiment, the driving maneuver component 610 calculates an angle between a current heading of the vehicle (e.g., an x-axis of the vehicle) and a line tangent to one or more safety regions that intersects with a wheel, axis, or center point of the vehicle. The driving maneuver component 610 may then use the calculated angle as a desired change in heading and may determine a driving maneuver, such as a turn or slowing of the vehicle, to perform the desired heading change. After performing the desired heading change, each wheel of the vehicle may avoid the safety margin regions to allow the vehicle to safely pass over or around the bollard receivers. In one embodiment, the driving maneuver component 610 may prioritize heading changes that cause the vehicle to turn away from a parallel or oncoming lane. For example, the driving maneuver component 610 may cause the vehicle to turn to a side where a shoulder of a road is located or into a turning lane, as long as there is not a risk of going off the roadway or impacting objects located on the shoulder or turning lane.

In one embodiment, the driving maneuver component 610 selects a driving maneuver that causes one or more tires to impact the bollards using a tread portion. For example, if the safety regions of the bollard receivers cannot be avoided, it may be safer to have the treads of the tires impact the bollard receivers. Impacting the bollard receivers with a tread portion may limit a risk of the bollard receivers impacting a side wall or undercarriage of the vehicle.

The history component 612 is configured to log information about bollard receivers to a driving history. For example, the history component 612 may log a location, height, or other information about bollard receivers (or bollards) to the driving history within the data store 116 of FIG. 1. In one embodiment, the history component 612 may log information to the driving history upon detection or upon driving over or avoiding the bollard receivers. For example, the history component 612 may wait until the vehicle has passed over or around the bollard receivers to log information about the bollard receivers to the driving history. For example, more accurate or complete information about the bollard receivers may be obtained as the vehicle approaches, passes over or around, and/or leaves the location of the bollard receivers. This accurate information may then be logged to the driving history so that the vehicle (or other vehicles) can have a high level of detail about the bollard receivers and know how best to safely maneuver around or over the bollard receivers. For example, relative positions, locations, heights, and other information may be readily available even before a vehicle initially detects the bollard receivers using its own perception data. In one embodiment, the history component 612 may log one or more of a location of the one or more bollard receivers, a height of at least one of the one or more bollard receivers, a path driven by the vehicle with respect to the one or more bollard receivers, an amount of force experienced by suspension systems of the vehicle as the vehicle passed over the bollard receivers, or any other information.

Figure 7:
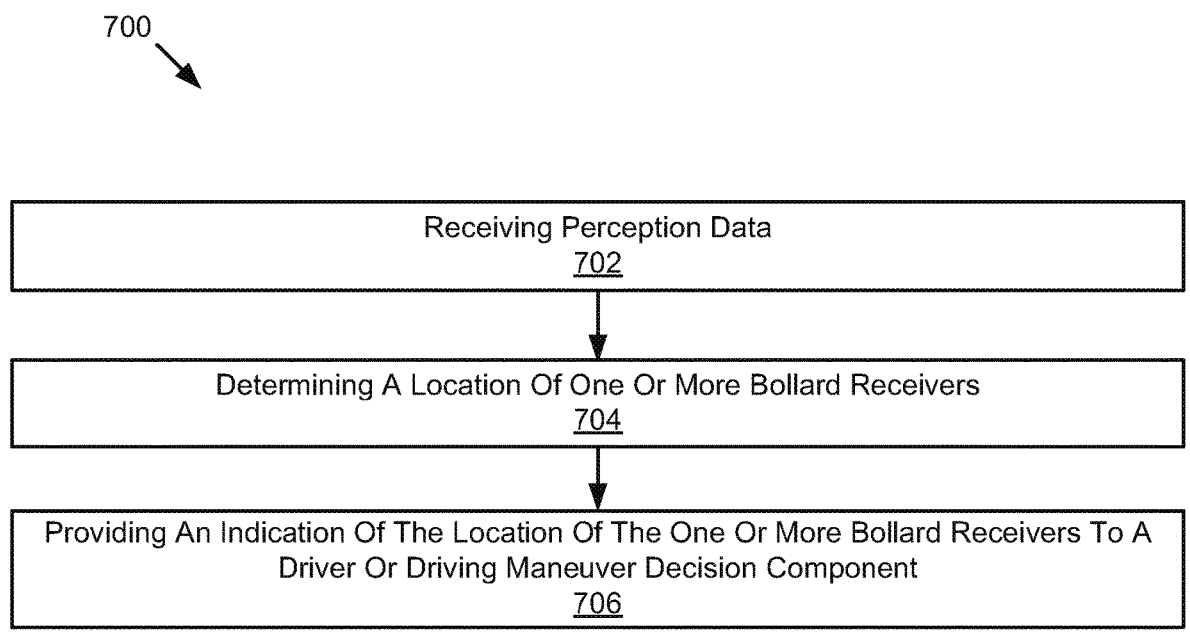
FIG. 7 is a schematic flow chart diagram illustrating a method for detecting bollard receivers, according to one implementation.

Referring now to FIG. 7, a schematic flow chart diagram of a method 700 for detecting bollard receivers is illustrated. The method 700 may be performed by a bollard component or an automated driving/assistance system, such as the bollard component 104 of FIG. 1 or 6 or the automated driving/assistance system 102 of FIG. 1.

The method 700 begins and a perception data component 602 receives perception data from one or more perception sensors of a vehicle at 702. A location component 604 determines, based on the perception data, a location of one or more bollard receivers in relation to a body of the vehicle at 704. For example, the location component 604 may use a neural network or object recognition algorithm to detect or identify the bollard receivers within an image or other frame of sensor data. In one embodiment, the location component 604 determines a location of the bollard receivers at least partially based on a driving history. At 706, a notification component 606 provides an indication of the location of the one or more bollard receivers to one or more of a driver and driving maneuver decision component. For example, the notification may be provided on a display for the driver. As another example, the notification may be provided to a driving maneuver decision component that is part of an automated driving/assistance system 102 or a driving maneuver component 610. In one embodiment, the driving maneuver decision component may use the location or other information about the bollard receivers into a decision matrix in order to decide what maneuvers, if any, should be performed by the vehicle to avoid or reduce damage to the vehicle.

EXAMPLES

The following examples pertain to further embodiments.

Example 1 is a method that includes receiving perception data from one or more perception sensors of a vehicle. The method includes determining, based on the perception data, a location of one or more bollard receivers in relation to a body of the vehicle. The method further includes providing an indication of the location of the one or more bollard receivers to one or more of a driver and driving maneuver decision component.

In Example 2, the method of Example 1 further includes determining the location in relation to the body based on information from a CAN bus of the vehicle.

In Example 3, determining the location in any of Examples 1-2 includes determining further based on a vehicle driving history.

In Example 4, the one or more perception sensors in any of Examples 1-3 include two or more of a camera, a radar sensor, a LIDAR sensor, a radar sensor, and an ultrasound sensor.

In Example 5, the method of any of Examples 1-4 further includes determining a height of the bollard receiver based on the perception data.

In Example 6, the method of any of Examples 1-5 further include determining a driving maneuver based on the location of the one or more bollard receivers.

In Example 7, the method of Example 6 further includes determining a safety margin for tires of the vehicle with respect to the one or more bollard receivers. Determining the driving maneuver includes determining a driving maneuver to avoid driving a tire of the vehicle within the safety margin of the one or more bollard receivers.

In Example 8, the method of any of Examples 6-7 includes determining a driving a maneuver that includes driving over a bollard receiver of the one or more bollard receivers using a tread portion of a tire of the vehicle.

In Example 9, the method of any of Examples 1-8 further include adjusting an active suspension of the vehicle based on a presence of the one or more bollard receivers.

In Example 10, the method of any of Examples 1-9 further include logging information about the bollard receiver to a driving history.

Example 11 is a system that includes a perception data component, a location component, and a driving maneuver component. The perception data component is configured to receive perception data from one or more perception sensors of a vehicle. The location component is configured to determine, based on the perception data, a location of one or more bollard receivers in relation to a body of the vehicle. The driving maneuver component is configured to determine a driving maneuver to avoid or reduce damage to the vehicle based on the location of the one or more bollard receivers.

In Example 12, the driving maneuver component of Example 11 is further configured to determine a safety margin for tires of the vehicle with respect to the one or more bollard receivers, wherein the driving maneuver component is configured to select a driving maneuver to cause each tire of the vehicle to either avoid coming within the safety margin of the one or more bollard receivers or to impact a bollard receiver of the one or more bollard receivers with a tread portion.

In Example 13, the system of any of Examples 11-12 further includes a suspension component configured to adjust a suspension of the vehicle based on a presence of the one or more bollard receivers, wherein adjusting the suspension of the vehicle includes one or more of adjusting a height of a portion of the vehicle and adjusting a stiffness of the suspension of a portion of the vehicle.

In Example 14, the system of any of Examples 11-13 further include a notification component configured to provide the driving maneuver as a suggestion to a driver of the vehicle and/or provide the driving maneuver to a vehicle control system of the vehicle to perform the driving maneuver.

Example 15 is computer readable storage media storing instructions that, when executed by one or more processors, cause the one or more processors to receive perception data from one or more perception sensors of a vehicle. The instructions cause the one or more processors to determine, based on the perception data, a location of one or more bollard receivers in relation to a body of the vehicle. The instructions cause the one or more processors to provide an indication of the location of the one or more bollard receivers to one or more of a driver and an automated driving system.

In Example 16, the instructions of Example 15 further cause the one or more processors to log information about the one or more bollard receivers to a driving history. The logged information about the one or more bollard receivers includes one or more of the location of the one or more bollard receivers, a height of at least one of the one or more bollard receivers, and a path driven by the vehicle with respect to the one or more bollard receivers.

In Example 17, the instructions of any of Examples 15-16 further cause the one or more processors to determine a driving path based on the location of the bollard receiver to avoid or reduce damage to the vehicle.

In Example 18, the instructions of Example 17 further cause the one or more processors to determine a safety margin for tires of the vehicle with respect to the one or more bollard receivers, wherein determining the driving path includes determining a driving path that causes each tire of the vehicle to either avoid driving a tire of the vehicle within the safety margin of the one or more bollard receivers or to impact a bollard receiver of the one or more bollard receivers with a tread portion.

In Example 19, the instructions of any of Examples 17-18 further cause the one or more processors to determine a height of the one or more bollard receivers with respect to a road surface and determine the driving path based additionally on the height.

In Example 20, the instructions in any of Examples 15-19 further cause the one or more processors to adjust an active suspension of the vehicle based on a presence of the one or more bollard receivers.

Example 21 is a system or device that includes means for implementing a method or realizing a system or apparatus as in any of Examples 1-20.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "autonomous vehicle" may be a vehicle that acts or operates completely independent of a human driver; or may be a vehicle that acts or operates independent of a human driver in some instances while in other instances a human driver may be able to operate the vehicle; or may be a vehicle that is predominantly operated by a human driver, but with the assistance of an automated driving/assistance system.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method comprising:
   receiving perception data from a perception sensor of a vehicle;
   calculating, based on the perception data, a location of a bollard receiver in relation to a body of the vehicle;
   calculating a safety margin centered on the bollard receiver;
   calculating a tangent from the body of the vehicle to an edge of the safety margin such that the tangent is drawn towards a side away from oncoming traffic; and
   determining a driving maneuver for the vehicle based on the location of the bollard receiver, the safety margin, and the tangent.

2. The method of claim 1, wherein calculating the location of the bollard receiver in relation to the body of the vehicle comprises calculating based on information from a controller area network (CAN) bus of the vehicle.

3. The method of claim 1, wherein calculating the location of the bollard receiver comprises calculating based on the perception data and further based on a vehicle driving history.

4. The method of claim 1, wherein the perception sensor comprises two or more of a camera, a radar sensor, a light detection and ranging (LIDAR) sensor, and an ultrasound sensor.

5. The method of claim 1, wherein the driving maneuver causes one or more tires of the vehicle to impact the bollard receiver with a tread portion of the one or more tires such that a sidewall portion of the one or more tires does not come in contact with the bollard receiver.

6. The method of claim 1, further comprising determining a height of the bollard receiver based on the perception data.

7. The method of claim 1, wherein calculating the safety margin comprises determining a distance around the bollard receiver to maintain between each wheel of the vehicle and the bollard receiver to ensure no part of the vehicle is damaged by the bollard receiver.

8. The method of claim 7, wherein determining the driving maneuver for the vehicle comprises determining a modified trajectory for the vehicle based on a current location of the vehicle and the safety margin such that one or more tires of the vehicle does not come within the safety margin centered on the bollard receiver.

9. The method of claim 1, wherein the driving maneuver further comprises adjusting an active suspension of the vehicle.

10. The method of claim 1, further comprising storing information about the bollard receiver in a driving history.

11. A system comprising:
    a perception sensor of a vehicle; and
    a controller of the vehicle comprising a processor that is programmable to execute instructions stored in non-transitory computer readable storage media, the instructions comprising:
      receiving perception data from the perception sensor of the vehicle;
      calculating, based on the perception data, a location of a bollard receiver in relation to a body of the vehicle;
      calculating a safety margin centered on the bollard receiver;
      calculating a tangent from the body of the vehicle to an edge of the safety margin such that the tangent is drawn towards a side away from oncoming traffic; and
      determining a driving maneuver for the vehicle based on the location of the bollard receiver, the safety margin, and the tangent.

12. The system of claim 11, further comprising a suspension system in communication with the processor and configured to adjust a suspension of the vehicle in response to an indication received from the processor, and wherein the instructions executed by the processor further comprise determining an adjustment to the suspension of the vehicle based on a presence of the bollard receiver, wherein the adjustment comprises one or more of adjusting a height of a portion of the vehicle or adjusting a stiffness of the suspension of a portion of the vehicle.

13. The system of claim 11, wherein the instructions further comprise one or more of:
    providing the driving maneuver as a suggestion to a driver of the vehicle; or
    providing the driving maneuver to a vehicle control system of the vehicle to execute the driving maneuver.

14. The system of claim 11, wherein the instructions further comprise determining a height of the bollard receiver based on the perception data, wherein the perception sensor comprises two or more of a camera, a radar sensor, a light detection and ranging (LIDAR) sensor, and an ultrasound sensor.

15. The system of claim 11, wherein the instructions are such that determining the driving maneuver for the vehicle comprises determining a modified trajectory for the vehicle based on a current location of the vehicle and the safety margin such that one or more tires of the vehicle does not come within the safety margin centered on the bollard receiver.

16. Non-transitory computer readable storage media storing instructions for execution by one or more processors, the instructions comprising:
    receiving perception data from a perception sensor of a vehicle;

calculating, based on the perception data, a location of a bollard receiver in relation to a body of the vehicle;

calculating a safety margin centered on the bollard receiver;

calculating a tangent from the body of the vehicle to an edge of the safety margin such that the tangent is drawn towards a side away from oncoming traffic; and determining a driving maneuver for the vehicle based on the location of the bollard receiver, the safety margin, and the tangent.

17. The non-transitory computer readable storage media of claim 16, wherein the instructions further comprises determining an adjustment to be made to a suspension system of the vehicle based on the presence of the bollard receiver, wherein the adjustment comprises one or more of adjusting a height of a portion of the vehicle or adjusting a stiffness of a suspension of a portion of the vehicle.

18. The non-transitory computer readable storage media of claim 16, wherein the instructions further comprise:

provoding the driving maneuver as a suggestion to a driver of the vehicle; or providing the driving maneuver to a vehicle control system of the vehicle to execute the driving maneuver.

19. The non-transitory computer readable storage media of claim 16, wherein the perception sensor comprises two or more of a camera, a radar sensor, a light detection and ranging (LIDAR) sensor, and an ultrasound sensor.

20. The non-transitory computer readable storage media of claim 16, wherein the instructions are such that determining the driving maneuver comprises determining a modified trajectory for the vehicle based on a current location of the vehicle and the safety margin such that one or more tires of the vehicle does not come within the safety margin centered on the bollard receiver.

* * * * *